（12) United States Patent
Poteet, III

(10) Patent No.: US 9,745,800 B2
(45) Date of Patent: *Aug. 29, 2017

(54) EXPANDABLE REAMERS HAVING NONLINEARLY EXPANDABLE BLADES, AND RELATED METHODS

(71) Applicant: Baker Hughes Incorporated, Houston, TX (US)

(72) Inventor: Carl E. Poteet, III, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,059

(22) Filed: Jun. 6, 2016

(65) Prior Publication Data

US 2016/0281436 A1 Sep. 29, 2016

Related U.S. Application Data

(63) Continuation of application No. 13/786,096, filed on Mar. 5, 2013.

(Continued)

(51) Int. Cl.
*E21B 7/28* (2006.01)
*E21B 10/32* (2006.01)
(Continued)

(52) U.S. Cl.
CPC .............. *E21B 10/32* (2013.01); *B23P 15/46* (2013.01); *E21B 7/28* (2013.01); *E21B 10/322* (2013.01); *E21B 10/325* (2013.01); *E21B 10/46* (2013.01)

(58) Field of Classification Search
CPC ................................ E21B 10/32; E21B 10/327
See application file for complete search history.

(56) References Cited

U.S. PATENT DOCUMENTS 1,485,642 A 3/1924 Stone
1,678,075 A 7/1928 Phipps
(Continued)

FOREIGN PATENT DOCUMENTS

EP 246789 A2 11/1987
EP 594420 B1 12/1997
(Continued)

OTHER PUBLICATIONS

International Search Report for International Application No. PCT/US2009/042511 dated Dec. 1, 2009, 4 pages.
(Continued)

*Primary Examiner* — David Andrews
*Assistant Examiner* — Michael Goodwin
(74) *Attorney, Agent, or Firm* — TraskBritt

(57) ABSTRACT

Expandable reamers for enlarging a borehole in a subterranean formation include a tubular body, at least one curved blade track carried by the tubular body, and at least one blade engaged with the at least one blade track and configured to slide along the curved blade track along a curved path between a first retracted blade position and a second expanded blade position. To form such an expandable reamer, a tubular body having at least one curved blade track carried by the tubular body may be formed, and at least one blade may be engaged with the blade track. The blade and blade track may be configured such that the blade slides along the blade track along a curved path between a retracted position and an expanded position. Such expandable reamers may be used to enlarge boreholes in subterranean formations.

18 Claims, 4 Drawing Sheets

Related U.S. Application Data

(60) Provisional application No. 61/617,840, filed on Mar. 30, 2012.

(51) Int. Cl.
*B23P 15/46* (2006.01)
*E21B 10/46* (2006.01)

(56) References Cited

U.S. PATENT DOCUMENTS

| | | |
|---|---|---|
| 2,069,482 A | 2/1937 | Seay |
| 2,116,572 A * | 5/1938 | Harr .................... E21B 43/112 166/55.3 |
| 2,136,518 A | 11/1938 | Nixon |
| 2,177,721 A | 10/1939 | Johnson et al. |
| 2,178,852 A | 11/1939 | Dunlap, Jr. |
| 2,225,165 A | 12/1940 | Dunlap, Jr. |
| 2,344,598 A | 3/1944 | Church |
| 2,532,418 A | 12/1950 | Page |
| 2,638,988 A | 5/1953 | Williams |
| 2,754,089 A | 7/1956 | Kammerer, Jr. |
| 2,758,819 A | 8/1956 | Kammerer, Jr. |
| 2,874,784 A | 2/1959 | Baker, Jr. et al. |
| 2,882,019 A | 4/1959 | Carr et al. |
| 3,083,765 A | 4/1963 | Kammerer |
| 3,105,562 A | 10/1963 | Stone et al. |
| 3,123,162 A | 3/1964 | Rowley |
| 3,126,065 A | 3/1964 | Chadderdon |
| 3,171,502 A | 3/1965 | Kammerer |
| 3,211,232 A | 10/1965 | Grimmer |
| 3,224,507 A | 12/1965 | Cordary, Jr. |
| 3,283,834 A | 11/1966 | Kammerer |
| 3,289,760 A | 12/1966 | Kammerer |
| 3,351,137 A | 11/1967 | Schulz et al. |
| 3,425,500 A | 2/1969 | Fuchs |
| 3,433,313 A | 3/1969 | Brown |
| 3,556,233 A | 1/1971 | Gilreath |
| 4,068,711 A * | 1/1978 | Aulenbacher ......... E21B 29/005 166/55.3 |
| 4,403,659 A | 9/1983 | Upchurch |
| 4,458,761 A | 7/1984 | Van Vreeswyk |
| 4,497,383 A | 2/1985 | Ostertag |
| 4,545,441 A | 10/1985 | Williamson |
| 4,589,504 A | 5/1986 | Simpson |
| 4,660,657 A | 4/1987 | Furse et al. |
| 4,690,229 A | 9/1987 | Raney |
| 4,693,328 A | 9/1987 | Furse et al. |
| 4,842,083 A | 6/1989 | Raney |
| 4,848,490 A | 7/1989 | Anderson |
| 4,854,403 A | 8/1989 | Ostertag et al. |
| 4,884,477 A | 12/1989 | Smith et al. |
| 4,889,197 A | 12/1989 | Boe |
| 4,893,678 A | 1/1990 | Stokley et al. |
| 5,139,098 A | 8/1992 | Blake |
| 5,211,241 A | 5/1993 | Mashaw et al. |
| 5,224,558 A | 7/1993 | Lee |
| 5,265,684 A | 11/1993 | Rosenhauch |
| 5,293,945 A | 3/1994 | Rosenhauch et al. |
| 5,305,833 A | 4/1994 | Collins |
| 5,318,131 A | 6/1994 | Baker |
| 5,318,137 A | 6/1994 | Johnson et al. |
| 5,318,138 A | 6/1994 | Dewey et al. |
| 5,332,048 A | 7/1994 | Underwood et al. |
| 5,343,963 A | 9/1994 | Bouldin et al. |
| 5,361,859 A | 11/1994 | Tibbitts |
| 5,368,114 A | 11/1994 | Tandberg et al. |
| 5,375,662 A | 12/1994 | Echols, III et al. |
| 5,425,423 A | 6/1995 | Dobson et al. |
| 5,437,308 A | 8/1995 | Morin et al. |
| 5,443,129 A | 8/1995 | Bailey et al. |
| 5,553,678 A | 9/1996 | Barr et al. |
| 5,560,440 A | 10/1996 | Tibbitts et al. |
| 5,740,864 A | 4/1998 | de Hoedt et al. |
| 5,788,000 A | 8/1998 | Maury et al. |
| 5,823,254 A | 10/1998 | Dobson et al. |
| 5,834,578 A | 11/1998 | Evans et al. |
| 5,862,870 A | 1/1999 | Hutchinson et al. |
| 5,887,655 A | 3/1999 | Haugen et al. |
| 6,039,131 A | 3/2000 | Beaton |
| 6,059,051 A | 5/2000 | Jewkes et al. |
| 6,109,354 A | 8/2000 | Ringgenberg et al. |
| 6,116,336 A | 9/2000 | Adkins et al. |
| 6,131,675 A | 10/2000 | Anderson |
| 6,173,795 B1 | 1/2001 | McGarian et al. |
| 6,189,631 B1 | 2/2001 | Sheshtawy |
| 6,213,226 B1 | 4/2001 | Eppink et al. |
| 6,227,312 B1 | 5/2001 | Eppink et al. |
| 6,289,999 B1 | 9/2001 | Dewey et al. |
| 6,325,151 B1 | 12/2001 | Vincent et al. |
| 6,378,632 B1 | 4/2002 | Dewey et al. |
| 6,488,104 B1 | 12/2002 | Eppink et al. |
| 6,494,272 B1 | 12/2002 | Eppink et al. |
| 6,615,933 B1 | 9/2003 | Eddison |
| 6,668,936 B2 | 12/2003 | Williamson, Jr. et al. |
| 6,668,949 B1 | 12/2003 | Rives |
| 6,681,860 B1 | 1/2004 | Yokley et al. |
| 6,702,020 B2 | 3/2004 | Zachman et al. |
| 6,708,785 B1 | 3/2004 | Russell et al. |
| 6,732,817 B2 | 5/2004 | Dewey et al. |
| 7,036,611 B2 | 5/2006 | Radford et al. |
| 7,048,078 B2 | 5/2006 | Dewey et al. |
| 7,314,099 B2 | 1/2008 | Dewey et al. |
| 7,325,630 B2 | 2/2008 | Takhaundinov et al. |
| 7,389,828 B2 | 6/2008 | Ritter et al. |
| 7,513,318 B2 | 4/2009 | Underwood et al. |
| 7,549,485 B2 | 6/2009 | Radford et al. |
| 7,703,553 B2 | 4/2010 | Eddison et al. |
| 7,997,354 B2 | 8/2011 | Radford et al. |
| 8,028,763 B2 | 10/2011 | Mackenzie |
| 8,028,767 B2 | 10/2011 | Radford et al. |
| 8,205,689 B2 | 6/2012 | Radford |
| 8,230,951 B2 | 7/2012 | Radford et al. |
| 8,464,812 B2 | 6/2013 | Radford et al. |
| 8,939,236 B2 | 1/2015 | Radford et al. |
| 9,038,748 B2 | 5/2015 | Radford et al. |
| 2002/0070052 A1 | 6/2002 | Armell |
| 2003/0029644 A1 | 2/2003 | Hoffmaster et al. |
| 2005/0145417 A1 | 7/2005 | Radford et al. |
| 2009/0294178 A1 | 12/2009 | Radford |
| 2010/0200298 A1 | 8/2010 | Mackenzie |
| 2011/0284233 A1 | 11/2011 | Wu et al. |
| 2012/0037426 A1 | 2/2012 | Ritchie et al. |
| 2012/0080228 A1 | 4/2012 | Radford et al. |
| 2012/0080231 A1 | 4/2012 | Radford et al. |
| 2012/0111579 A1 | 5/2012 | Radford et al. |
| 2013/0256034 A1 | 10/2013 | Poteet, III |

FOREIGN PATENT DOCUMENTS

| | | |
|---|---|---|
| EP | 1036913 A1 | 10/2002 |
| EP | 1044314 A1 | 3/2005 |
| EP | 1614852 A1 | 1/2006 |
| GB | 2328964 A | 3/1999 |
| GB | 2344607 A | 6/2000 |
| GB | 2344122 B | 4/2003 |
| GB | 2420803 A | 6/2006 |
| GB | 2393461 B | 10/2006 |
| GB | 2426269 B | 2/2007 |
| RU | 2172385 C1 | 8/2001 |
| WO | 0031371 A1 | 6/2000 |
| WO | 2007017651 A1 | 2/2007 |
| WO | 2007024795 A1 | 3/2007 |
| WO | 2009120750 A3 | 12/2009 |
| WO | 2009135116 A3 | 3/2010 |

OTHER PUBLICATIONS

International Written Opinion for International Application No. PCT/US2009/042511 dated Dec. 1, 2009, 4 pages.
International Preliminary Report on Patentability for International Application No. PCT/US2009/042511 dated Nov. 2, 2010, 5 pages.
International Search Report for International Application No. PCT/US2013/034323 dated Jun. 26, 2013, 5 pages.

(56) References Cited

OTHER PUBLICATIONS

International Preliminary Report on Patentability for International Application No. PCT/US2013/034323 dated Oct. 1, 2014, 8 pages.
International Written Opinion for International Application No. PCT/US2013/034323 dated Jun. 26, 2013, 7 pages.

* cited by examiner

EXPANDABLE REAMERS HAVING NONLINEARLY EXPANDABLE BLADES, AND RELATED METHODS

CROSS-REFERENCE TO RELATED APPLICATION

This application is a continuation of U.S. patent application Ser. No. 13/786,096, filed Mar. 5, 2013, now U.S. Pat. No. 9,388,638, issued Jul. 12, 2016, which application claims the benefit of U.S. Provisional Patent Application Ser. No. 61/617,840, filed Mar. 30, 2012, the disclosure of each of which is hereby incorporated herein in its entirety by this reference.

TECHNICAL FIELD

Embodiments of the present disclosure relate generally to an expandable reamer apparatus for enlarging a subterranean borehole and to methods of making and using such an expandable reamer apparatus.

BACKGROUND

Boreholes are formed in subterranean earth formations for a variety of purposes, such as oil and gas extraction and geothermal energy extraction. Such boreholes are typically formed by drilling the borehole into and through subterranean formations using a drill bit, such as an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the borehole (also referred to as a "wellbore"). The drill bit is coupled, either directly or indirectly, to an end of what is referred to in the art as a "drill string," which comprises a series of elongated tubular segments connected end-to-end and extends into the borehole from the surface of the formation. Often various tools and components, including the drill bit, may be coupled together at the distal end of the drill string at the bottom of the borehole being drilled. This assembly of tools and components is referred to in the art as a "bottom hole assembly" (BHA).

The drill bit may be rotated within the borehole by rotating the drill string from the surface of the formation, or the drill bit may be rotated by coupling the drill bit to a downhole motor, which is also coupled to the drill string and disposed proximate the bottom of the borehole. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the borehole.

In some applications, it may be desirable to enlarge a section of a borehole that has been drilled by a drill bit. Various tools have been developed for enlarging the diameter of a previously drilled borehole. Such tools include so called "reamers," which comprise a tubular body carrying one or more blades on the lateral sides of the tubular body. The blades have cutting elements or other cutting structures thereon, which remove formation material from the sidewalls of the borehole as the reamer is rotated within the borehole. The reamer may be incorporated in the BHA vertically above a pilot drill bit. In this configuration, as the BHA is advanced into the formation, the pilot drill bit drills the borehole, and the reamer, which follows the pilot drill bit through the formation, reams (i.e., enlarges the diameter of) the borehole previously drilled by the pilot drill bit. Of course, a reamer may be employed anywhere along a drill string as needed or desirable.

BRIEF SUMMARY

In some embodiments, the present disclosure includes an expandable reamer apparatus for enlarging a borehole in a subterranean formation. The reamer apparatus has a tubular body, at least one curved blade track carried by the tubular body, and at least one blade engaged with the at least one blade track. The at least one blade is configured to slide along the curved blade track along a curved path between a first retracted blade position and a second expanded blade position.

In additional embodiments, the present disclosure includes a method of manufacturing an expandable reamer apparatus in which a tubular body is formed that has at least one curved blade track carried by the tubular body. At least one blade is engaged with the at least one curved blade track. The at least one blade and the at least one curved blade track are configured such that the at least one blade slides along the at least one curved blade track along a curved path between a first retracted blade position and a second expanded blade position.

In yet further embodiments, the present disclosure includes methods of enlarging a borehole in a subterranean formation in which an expandable reamer apparatus is advanced into a borehole in a subterranean formation. The expandable reamer apparatus has a tubular body and at least one blade engaged with a curved blade track on the tubular body. The at least one blade is slid along the curved blade track from a retracted position of the at least one blade to an expanded position of the at least one blade. The at least one blade rotates relative to a longitudinal axis of the expandable reamer apparatus as the at least one blade slides along the curved blade track. The expandable reamer apparatus is rotated within the borehole while the at least one blade is in the expanded position to enlarge the borehole in the subterranean formation.

DETAILED DESCRIPTION

The illustrations presented herein are, in some instances, not actual views of any particular expandable reamer apparatus or component thereof, but are merely idealized representations that are employed to describe embodiments of the present disclosure. Elements common between figures may retain the same numerical designation.

Figure 1:
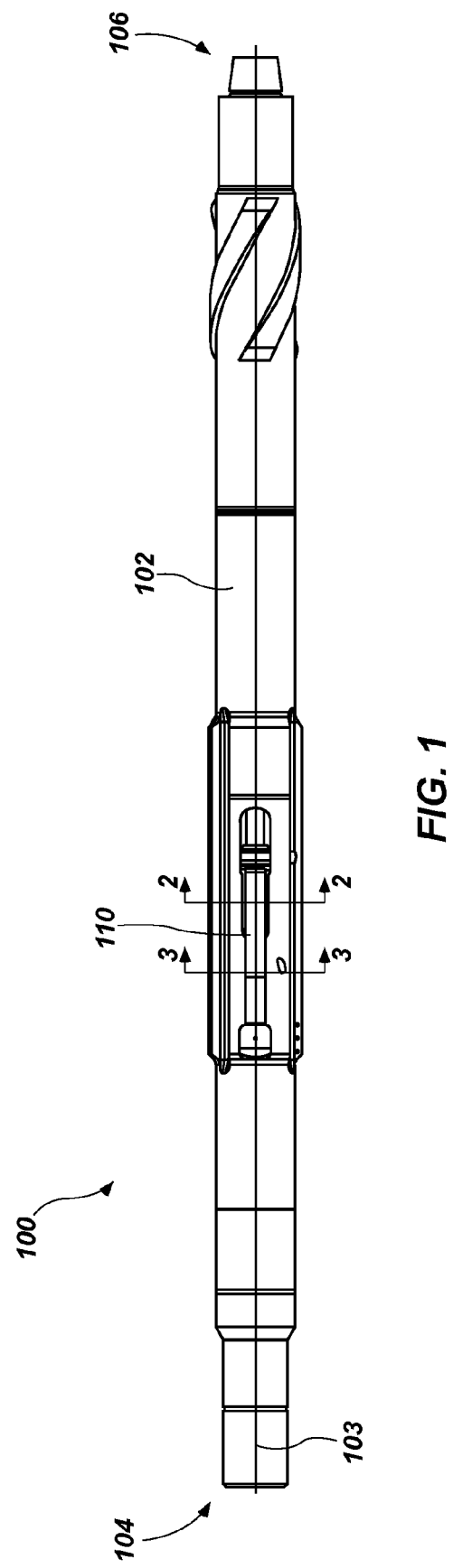
FIG. 1 is a side plan view of an embodiment of an expandable reamer apparatus having expandable blades engaged with corresponding blade tracks, wherein the blades slide along the blade tracks along curved paths between retracted and expanded blade positions.

FIG. 1 is a side plan view of an embodiment of an expandable reamer apparatus or "reamer" 100 of the present disclosure. The reamer 100 has a generally tubular body 102 extending between an upper first end 104 and a second lower end 106. The terms "upper" and "lower" are used herein to describe locations and directions relative to one another when the expandable reamer apparatus 100 is positioned within a vertical borehole. Thus, the upper first end 104 is typically located above and closer to the surface of the earth relative to the second lower end 106, and the second lower end 106 is typically located below and closer to the bottom of a borehole, when the reamer 100 is disposed in a borehole. The ends 104 and 106 may comprise threaded connection portions (e.g., a threaded pin and/or a threaded box conforming to industry standards such as those promulgated by the American Petroleum Institute (API)) to allow the ends 104, 106 to be coupled to adjacent components within a bottom hole assembly (BHA) or to adjacent segments of a drill string.

The reamer 100 further includes a plurality of expandable and retractable blades 110. The blades 110 are configured to slide relative to the tubular body 102 between retracted blade positions and expanded blade positions, as described in further detail below. The blades 110 may carry cutting structures 111 (see FIGS. 4 and 5) for removing formation material from the sidewalls of the borehole when the blades 110 are in the expanded blade positions and the reamer 100 is rotated within the borehole. Many different types of cutting structures 111 for use on reamer blades and other earth-boring tools are known in the art and may be carried on the blades 110 in accordance with embodiments of the present disclosure. As non-limiting examples, such cutting structures 111 may comprise elements that are separately formed and bonded to the blades 110 (e.g., polycrystalline diamond compact (PDC) cutting elements, diamond-impregnated cutting inserts, etc.), and/or cutting structures 111 that are formed on the blades 110, such as deposits of hardfacing material.

Figure 2:
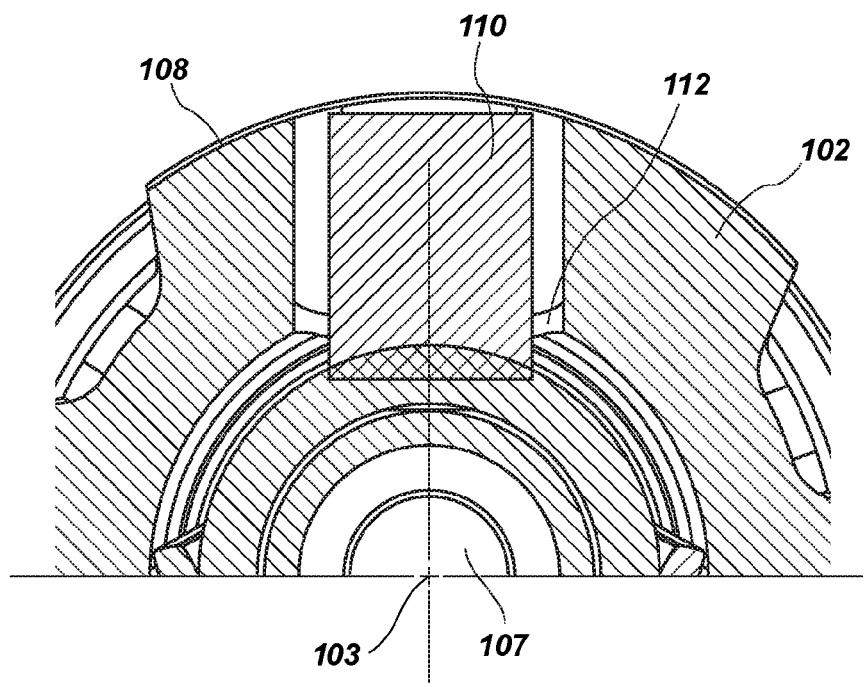
FIG. 2 is a partial transverse cross-sectional view of the expandable reamer apparatus of FIG. 1 taken along section line 2-2 in FIG. 1, and illustrates one blade of the expandable reamer apparatus in a retracted position.
Figure 3:
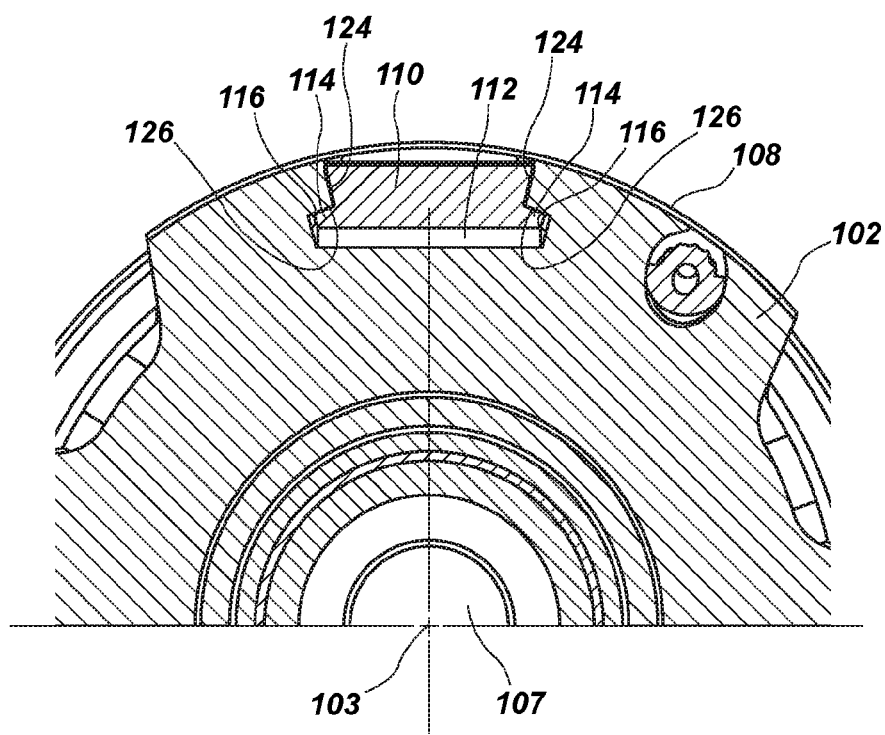
FIG. 3 is a partial transverse cross-sectional view of the expandable reamer apparatus of FIG. 1 taken along section line 3-3 in FIG. 1, and illustrates one blade of the expandable reamer apparatus in a retracted position.

FIG. 2 is a partial transverse cross-sectional view of the reamer 100 taken along section line 2-2 of FIG. 1, which extends through a first lower portion of the blade 110, and FIG. 3 is a partial transverse cross-sectional view of the reamer 100 taken along section line 3-3 of FIG. 1, which extends through a second upper portion of the blade 110.

As can be seen in FIGS. 2 and 3, the tubular body 102 has an internal bore 107 extending longitudinally therethrough between the ends 104, 106 of the tubular body 102. During use of the reamer 100 in a reaming operation, drilling fluid pumped down the borehole through the drill sting may flow through the internal bore of the tubular body 102 between the ends 104, 106, thus allowing the drilling fluid to pass through the reamer 100. In some embodiments, the pressure of the flowing drilling fluid may be used to expand the blades 110.

With continued reference to FIGS. 2 and 3, the reamer 100 includes a corresponding blade track 112 for each of the blades 110. Each blade 110 includes track engagement features that are configured to engage complementary blade engagement features of the corresponding blade track 112. For example, as shown in FIG. 3, each blade 110 may include integral lateral projections 114 that extend laterally into complementary lateral recesses 116 of the blade tracks 112. The engagement of the projections 114 of the blades 110 with the recesses 116 of the blade tracks 112 retains the blades 110 within the reamer 100. The blades 110 are configured to slide along the blade tracks 112 between the retracted blade positions and the expanded blade positions. The engagement of the projections 114 of the blades 110 with the recesses 116 of the blade tracks 112 also guides movement of the blades 110 along the blade tracks 112 between the retracted blade positions and the extended blade positions.

As shown in FIG. 3, the complementary abutting surfaces of the blades 110 and the tubular body 102 at the interface therebetween along the lateral sides of the blades 110 may have a dovetail shape. In this configuration, each blade 110 may be radially supported on the tubular body 102 by sloped side surfaces 124 of the tubular body 102, such that complementary abutting surfaces of the blades 110 wedge against the sloped side surfaces 124 of the tubular body 102 responsive to forces acting radially inwardly on the blades 110. Similarly, each blade 110 may be retained on the tubular body 102 by sloped side surfaces 126 of the tubular body 102, such that complementary abutting surfaces of the projections 114 of the blades 110 wedge against the sloped side surfaces 126 of the tubular body 102 responsive to forces acting radially outwardly on the blades 110.

Figure 4:
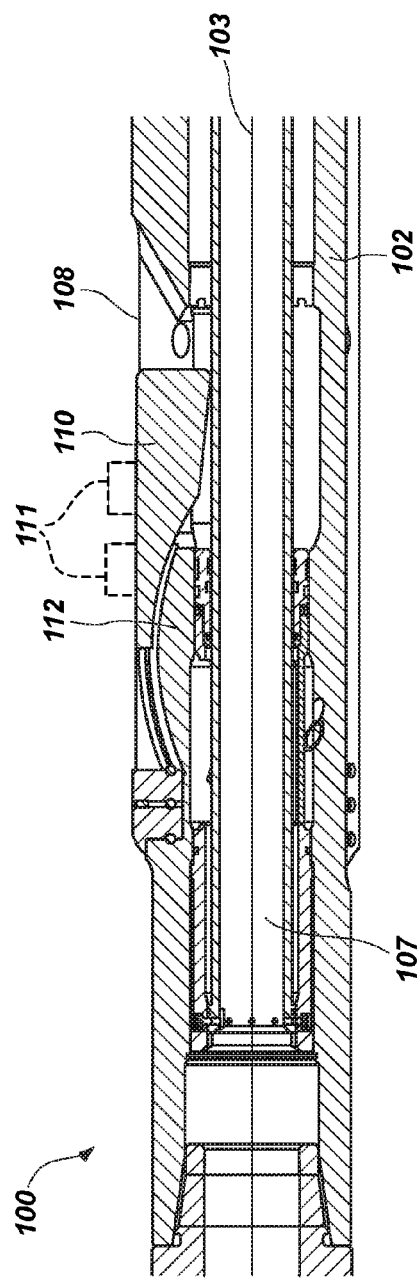
FIG. 4 is a partial longitudinal cross-sectional view of a portion of the expandable reamer apparatus of FIG. 1 and illustrates one expandable blade thereof in a retracted position.
Figure 5:
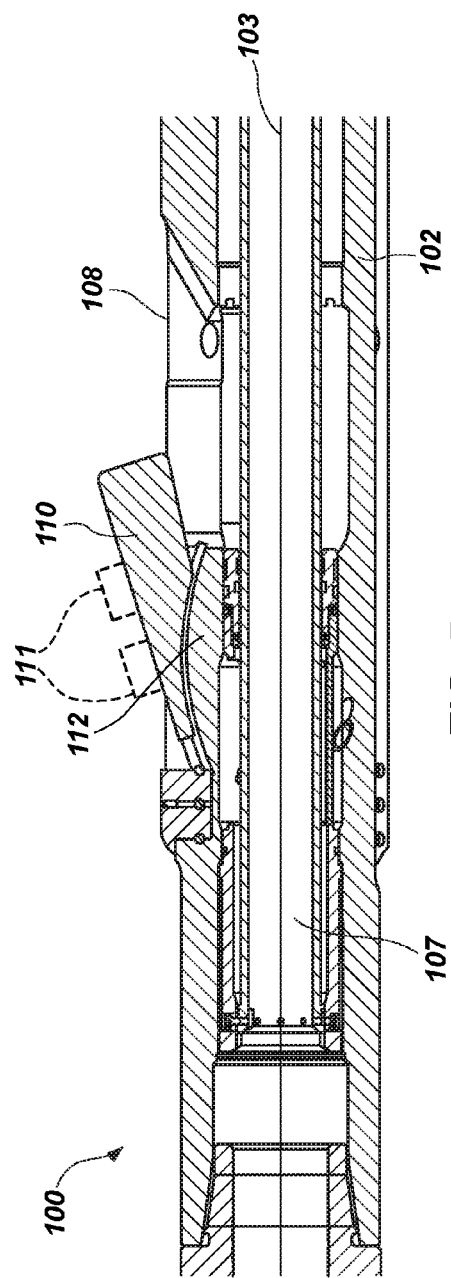
FIG. 5 is a partial longitudinal cross-sectional view like that of FIG. 4 and illustrates the expandable blade in an expanded position.

FIG. 4 is a partial longitudinal cross-sectional view of a portion of the reamer 100 illustrating one of the blades 110 in the retracted blade position, and FIG. 5 is a partial longitudinal cross-sectional view like that of FIG. 4 illustrating the blade 110 in the expanded blade position. As can be appreciated by comparison of FIGS. 4 and 5, the blade 110 extends a first shorter distance from the longitudinal axis 103 of the tubular body 102 in the retracted blade position (FIG. 4), and extends a second longer distance from the longitudinal axis 103 of the tubular body 102 in the expanded blade position (FIG. 5). The blades 110 may not extend radially outward beyond an outer surface 108 of the tubular body 102 in the retracted blade positions. In other words, the blades 110 may be flush with, or recessed relative to, the outer surface 108 of the tubular body 102 when the blades 110 are in the retracted blade positions. The blades 110 do extend radially outward beyond the outer surface 108 of the tubular body 102 in the expanded blade positions.

The reamer 100 may have a retracted diameter $D_R$ defined as the maximum diameter of the reamer 100 when the blades 110 are in the retracted blade positions, and an expanded diameter $D_E$ defined as the reaming diameter of the reamer 100 when the blades 110 are in the expanded blade positions. In some embodiments, a ratio of the expanded diameter $D_E$ to the retracted diameter $D_R$ ($D_E$ to $D_R$) may be at least 1.1 to 1.0, at least 1.25 to 1.0, or even at least 1.5 to 1.0 (e.g., about 1.55 to 1.0). As non-limiting embodiments, the blades 110 may project radially outward beyond the outer surface 108 of the tubular body 102 by at least about 2.54 centimeters (1.0 inch), at least about 7.62 centimeters (3.0 inches), or even at least about 15.24 centimeters (6.0 inches), when the blades 110 are in the expanded blade positions.

Figure 6:
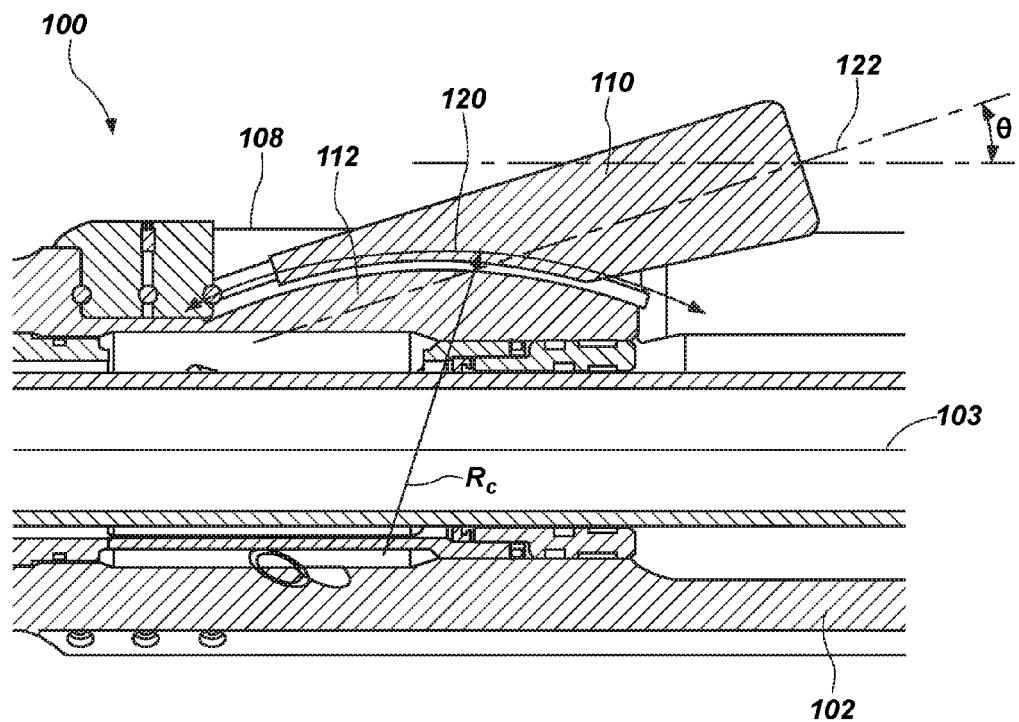
FIG. 6 is an enlarged view of a portion of FIG. 5.

As shown in FIGS. 4 and 5, the blades 110 may be generally elongated in the longitudinal direction parallel to the longitudinal axis 103 of the tubular body 102. As shown in FIG. 4, a longitudinal axis 122 of each blade 110 (FIG. 6) may be at least substantially parallel to the longitudinal axis 103 of the tubular body 102 when the blade 110 is in the retracted blade position. As shown in FIG. 6, a longitudinal axis 122 of each blade 110 may be oriented at an acute angle to the longitudinal axis 103 of the tubular body 102 when the blade 110 is in the expanded blade position. The blades 110 may extend longitudinally downward (in the direction toward the second lower end 106 (FIG. 1) of the tubular body 102) beyond the lower longitudinal ends of the tracks 112. In other words, the blades 110 may be cantilevered beyond the lower longitudinal ends of the tracks 112. In some embodiments, the blades 110 may extend longitudinally beyond the lower longitudinal ends of the tracks 112 in each of the retracted blade positions and the expanded blade positions, as shown in FIGS. 4 and 5.

FIG. 6 is an enlarged view of a portion of FIG. 5, and illustrates a blade 110 in the expanded blade position. In accordance with embodiments of the present disclosure, the blades 110 are configured to slide along a curved pathway 120, illustrated in FIG. 6 by a double-ended curved directional arrow, between the retracted blade positions and the expanded blade positions. By sliding along curved pathways between the retracted blade positions and the expanded blade positions, the blades 110 both translate laterally outward relative to the longitudinal axis 103 of the tubular body 102, and rotate relative to the longitudinal axis 103 of the tubular body 102. The axis of rotation about which each blade 110 rotates is perpendicular to the longitudinal axis 103 of the tubular body 102 and perpendicular to a direction of expansion of that blade 110 with regard to tubular body 102.

As previously mentioned, a longitudinal axis 122 of each of the blades 110 may be oriented at an angle θ relative to the longitudinal axis 103 when the blades 110 are in the expanded blade position. As non-limiting examples, the angle θ may be between about five degrees (5°) and about ninety degrees (90°), between about ten degrees (10°) and about eighty degrees (80°), or even between about twenty degrees (20°) and about seventy degrees (70°).

To enable the blades 110 to slide along the curved pathway 120, complementary surfaces of the blades 110 and the tracks 112 may have corresponding curved geometries. To alleviate binding between the blades 110 and the tracks 112, the complementary surfaces of the blades 110 and the tracks 112 may have an at least substantially constant radius of curvature $R_c$. By way of example and not limitation, the at least substantially constant radius of curvature $R_c$ may between about 25.4 centimeters (10 inches) and about 50.8 centimeters (20 inches). For example, each track 112 may have at least one curved blade ramp surface that abuts against and supports the blade 110 engaged with the track 112, and that has an at least substantially constant radius of curvature $R_c$. The blade 110 may have a complementary curved radially inner surface having the same at least substantially constant radius of curvature $R_c$ and configured to abut against and slide along the curved blade ramp surface of the track 112.

By using blades 110 that are elongated generally in the direction parallel to the longitudinal axis 103 of the tubular body 102, the combined translation and rotation of the blades 110 as they move between the retracted blade positions and the expanded blade positions enables the blades 110 to extend radially outward from the outer surface 108 of the tubular body 102 farther in the expanded blade positions relative to previously known reamers of the same diameter.

The reamer 100 may further include an actuating mechanism for moving the blades 110 from the retracted blade positions (FIG. 4) to the expanded blade positions (FIG. 5). Various types of such actuating mechanisms are known in the art, and similar such actuating mechanisms may be employed in embodiments of reamers of the present disclosure, such as the reamer 100. By way of example and not limitation, an actuating mechanism like that described in U.S. Pat. No. 7,900,717, which issued Mar. 8, 2011 in the name of Radford et al., which is hereby incorporated herein in its entirety by this reference, may be employed in the reamer 100. As described therein, such an actuating mechanism may include, for example, a traveling sleeve configured to travel longitudinally within an internal bore 107 within the tubular body 102 from a first position to a second position responsive to an increase in the pressure of the drilling fluid within the internal bore 107 (which may be caused, for example, by dropping a ball from the surface of the formation and catching the ball in a ball trap sleeve within the reamer 100). When the traveling sleeve moves into the second position, the pressure of the drilling fluid may cause a push sleeve located in the internal bore 107 below the blades 110 to move in the upward direction toward the blades 110. The push sleeve may be coupled to each of the blades 110 using, for example, a yoke and/or other linkage members. As a result, as the push sleeve moves in the upward direction toward the blades 110, the blades 110 are pushed in the upward direction along the tracks 112, such that the blades 110 move from the retracted blade position to the expanded blade position. The push sleeve may be biased, using a spring, for example, in the downward direction, such that reduction of drilling fluid pressure results in the push sleeve returning to the initial downward position and pulling the blades 110 along the tracks 112 back to the initial retracted blade positions.

Other types of blade actuating mechanisms are known in the art and may be employed in embodiments of reamers as described herein. As additional examples, any of the actuation mechanisms disclosed in the following references may be employed in embodiments of expandable reamers having sliding and rotating blades as described herein: U.S. Pat. No. 7,036,611 issued May 2, 2006 to Radford et al; U.S. Pat. No. 7,549,485 issued Jun. 23, 2009 to Radford et al.; U.S. Pat. No. 7,997,354 issued Aug. 16, 2011 to Radford et al.; U.S. Pat. No. 8,205,689 issued Jun. 26, 2012 to Radford et al.; U.S. Pat. No. 8,230,951 issued Jul. 31, 2012 to Radford et al.; U.S. Patent Application Publication No. 2012/0080231 A1 published Apr. 5, 2012 in the name of Radford et al., now U.S. Pat. No. 8,464,812, issued Jun. 18, 2013; U.S. Patent Application Publication No. 2012/0080228 A1 published Apr. 5, 2012 in the name of Radford et al., now U.S. Pat. No. 8,939,236, issued Jan. 27, 2015; and U.S. Patent Application Publication No. 2012/0111579 A1 published May 10, 2012 in the name of Radford et al., now U.S. Pat. No. 9,038,748, issued May 26, 2015, the disclosure of each of which is hereby incorporated herein in its entirety by this reference.

Additional non-limiting example embodiments of the disclosure are set forth below.

Embodiment 1

An expandable reamer apparatus for enlarging a borehole in a subterranean formation, comprising: a tubular body; at least one curved blade track carried by the tubular body; and at least one blade engaged with the at least one blade track and configured to slide along the curved blade track along a curved path between a first retracted blade position and a second expanded blade position.

Embodiment 2

The expandable reamer apparatus of Embodiment 1, wherein complementary abutting surfaces of the at least one curved blade track and the at least one blade each have an at least substantially constant radius of curvature.

Embodiment 3

The expandable reamer apparatus of Embodiment 2, wherein the at least substantially constant radius of curvature is between about 25.4 centimeters and about 50.8 centimeters.

Embodiment 4

The expandable reamer apparatus of any one of Embodiments 1 through 3, wherein the at least one blade extends a first distance from a longitudinal axis of the tubular body in the first retracted blade position and extends a second distance from the longitudinal axis of the tubular body in the second expanded blade position, the second distance being greater than the first distance.

Embodiment 5

The expandable reamer apparatus of Embodiment 4, wherein the at least one blade does not extend radially outward beyond an outer surface of the tubular body in the first retracted blade position.

Embodiment 6

The expandable reamer apparatus of Embodiment 4 or Embodiment 5, wherein the at least one blade extends radially outward beyond an outer surface of the tubular body adjacent the at least one blade by a distance of at least 7.62 centimeters in the second expanded blade position.

Embodiment 7

The expandable reamer apparatus of any one of Embodiments 1 through 6, wherein a longitudinal axis of the at least one blade rotates relative to a longitudinal axis of the tubular body as the at least one blade moves from the first retracted blade position and a second expanded blade position.

Embodiment 8

The expandable reamer apparatus of Embodiment 7, wherein the longitudinal axis of the at least one blade is oriented at an acute angle relative to the longitudinal axis of the tubular body when the at least one blade is in the second expanded blade position.

Embodiment 9

The expandable reamer apparatus of Embodiment 7 or Embodiment 8, wherein the longitudinal axis of the at least one blade is oriented at least substantially parallel to the longitudinal axis of the tubular body when the at least one blade is in the first retracted blade position.

Embodiment 10

The expandable reamer apparatus of any one of Embodiments 1 through 9, wherein the at least one blade comprises at least one lateral protrusion, the at least one curved blade track comprising at least one lateral recess, the at least one lateral protrusion of the at least one blade extending into and engaging the at least one lateral recess of the at least one blade track.

Embodiment 11

The expandable reamer apparatus of any one of Embodiments 1 through 10, wherein the expandable reamer apparatus has a retracted diameter defined as a maximum diameter of the expandable reamer apparatus when the at least one blade is in the retracted blade position, and an expanded diameter defined as a reaming diameter of the expandable reamer apparatus when the at least one blade is in the expanded blade position, and wherein a ratio of the expanded diameter to the retracted diameter is at least 1.1 to 1.0.

Embodiment 12

The expandable reamer apparatus of Embodiment 11, wherein the ratio of the expanded diameter to the retracted diameter is at least 1.25 to 1.0.

Embodiment 13

The expandable reamer apparatus of Embodiment 12, wherein the ratio of the expanded diameter to the retracted diameter is at least 1.5 to 1.0.

Embodiment 14

A method of manufacturing an expandable reamer apparatus, the method comprising: forming a tubular body having at least one curved blade track carried by the tubular body; and engaging at least one blade with the at least one curved blade track and configuring the at least one blade and the at least one curved blade track such that the at least one blade slides along the at least one curved blade track along a curved path between a first retracted blade position and a second expanded blade position.

Embodiment 15

The method of Embodiment 14, further comprising forming complementary abutting surfaces of the at least one curved blade track and the at least one blade to each have an at least substantially constant radius of curvature between about 25.4 centimeters and about 50.8 centimeters.

Embodiment 16

The method of Embodiment 14 or Embodiment 15, further comprising configuring the at least one blade and the at least one curved blade track such that the at least one blade does not extend radially outward beyond an outer surface of the tubular body in the first retracted blade position, and such that the at least one blade extends radially outward beyond an outer surface of the tubular body adjacent the at least one blade by a distance of at least 7.62 centimeters in the second expanded blade position.

Embodiment 17

The method of any one of Embodiments 14 through 16, further comprising configuring the at least one blade and the at least one curved blade track such that the expandable reamer apparatus has a retracted diameter defined as a maximum diameter of the expandable reamer apparatus when the at least one blade is in the retracted blade position, and an expanded diameter defined as a reaming diameter of the expandable reamer apparatus when the at least one blade is in the expanded blade position, a ratio of the expanded diameter to the retracted diameter being at least 1.1 to 1.0.

Embodiment 18

A method of enlarging a borehole in a subterranean formation, the method comprising: advancing an expandable reamer apparatus into a borehole in a subterranean formation, the expandable reamer apparatus having a tubular body and at least one blade engaged with a curved blade track on the tubular body; and sliding the at least one blade along the curved blade track from a retracted position of the at least one blade to an expanded position of the at least one blade, the at least one blade rotating relative to a longitudinal axis of the expandable reamer apparatus as the at least one blade slides along the curved blade track; and rotating the expandable reamer apparatus within the borehole while the at least one blade is in the expanded position to enlarge the borehole in the subterranean formation.

Embodiment 19

The method of Embodiment 18, wherein sliding the at least one blade along the curved blade track from the retracted position of the at least one blade to the expanded position of the at least one blade comprises sliding the at least one blade along a curved path having an at least substantially constant radius of curvature between about 25.4 centimeters and about 50.8 centimeters.

Embodiment 20

The method of Embodiment 18 or Embodiment 19, wherein sliding the at least one blade along the curved blade track from the retracted position of the at least one blade to the expanded position of the at least one blade comprises causing the at least one blade to extend radially outward beyond an outer surface of the tubular body adjacent the at least one blade by a distance of at least 7.62 centimeters.

The example embodiments of the disclosure described above do not limit the scope of the invention, since these embodiments are merely examples of embodiments of the invention, which is defined by the scope of the appended claims and their legal equivalents. Any equivalent embodiments are intended to be within the scope of this invention. Indeed, various modifications of the disclosure, in addition to those shown and described herein, such as alternative useful combinations of the elements described, will become apparent to those skilled in the art from the description. Such modifications and embodiments are also intended to fall within the scope of the appended claims.

What is claimed is:

1. An expandable reamer apparatus for enlarging a borehole in a subterranean formation, comprising:
   a tubular body;
   at least one convexly curved blade track carried by the tubular body; and
   at least one blade engaged with the at least one convexly curved blade track and configured to slide along the at least one convexly curved blade track between a retracted blade position and an expanded blade position, wherein the at least one blade is cantilevered beyond a lower longitudinal end of the at least one convexly curved blade track in the expanded blade position, the lower longitudinal end located below an upper longitudinal end of the at least one convexly curved blade track when the expandable reamer apparatus is disposed vertically in a borehole,
   wherein a convexly curved surface of the at least one convexly curved blade track faces the at least one blade engaged therewith,
   wherein the at least one blade is retained on the tubular body by sloped side surfaces of the tubular body abutting against complementary sloped side surfaces of the at least one blade, the complimentary side surfaces of the at least one blade and the tubular body having a dovetail shape.

2. The expandable reamer apparatus of claim 1, wherein the expandable reamer apparatus has a retracted diameter defined as a maximum diameter of the expandable reamer apparatus when the at least one blade is in the retracted blade position, and an expanded diameter defined as a reaming diameter of the expandable reamer apparatus when the at least one blade is in the expanded blade position, and wherein a ratio of the expanded diameter to the retracted diameter is at least 1.1 to 1.0.

3. The expandable reamer apparatus of claim 2, wherein the ratio of the expandable diameter to the retracted diameter is at least 1.25 to 1.0.

4. The expandable reamer apparatus of claim 3, wherein the ratio of the expandable diameter to the retracted diameter is at least 1.5 to 1.0.

5. The expandable reamer apparatus of claim 1, further comprising a plurality of cutting structures disposed on the at least one blade.

6. The expandable reamer apparatus of claim 1, wherein the at least one blade is retained on the tubular body by lateral projections integral with the at least one blade extending into a complementary lateral recess of the at least one convexly curved blade track.

7. The expandable reamer apparatus of claim 1, wherein the at least one blade extends radially outward beyond an outer surface of the tubular body adjacent the at least one blade by a distance of at least 2.54 centimeters in the expanded blade position.

8. An expandable reamer apparatus for enlarging a borehole in a subterranean formation, comprising:
   a tubular body;
   at least one curved blade track carried by the tubular body;
   at least one blade engaged with the at least one curved blade track and configured to slide along the at least one curved blade track between a retracted blade position and an expanded blade position, wherein complementary abutting surfaces of the at least one curved blade track and the at least one blade each have an at least substantially constant radius of curvature between 25.4 centimeters and 50.8 centimeters.

9. The expandable reamer apparatus of claim 8, wherein the at least one blade extends beyond a lower longitudinal end of the curved blade track in the expanded blade position, the lower longitudinal end located below an upper longitudinal end of the at least one curved blade track when the expandable reamer apparatus is disposed vertically in a borehole.

10. The expandable reamer apparatus of claim 9, wherein the at least one blade is cantilevered beyond the lower longitudinal end of the curved blade track in the expanded blade position.

11. The expandable reamer apparatus of claim 8, wherein the expandable reamer apparatus has a retracted diameter defined as a maximum diameter of the expandable reamer apparatus when the at least one blade is in the retracted blade position, and an expanded diameter defined as a reaming diameter of the expandable reamer apparatus when the at least one blade is in the expanded blade position, and wherein a ratio of the expanded diameter to the retracted diameter is at least 1.1 to 1.0.

12. The expandable reamer apparatus of claim 11, wherein the ratio of the expandable diameter to the retracted diameter is at least 1.25 to 1.0.

13. The expandable reamer apparatus of claim 12, wherein the ratio of the expandable diameter to the retracted diameter is at least 1.5 to 1.0.

14. A method of manufacturing an expandable reamer apparatus, the method comprising:
engaging at least one blade with at least one convexly curved blade track carried by a tubular body and configuring the at least one blade and the at least one convexly curved blade track such that the at least one blade slides along the at least one convexly curved blade track between a retracted blade position and an expanded blade position, wherein the at least one blade is cantilevered beyond a lower longitudinal end of the at least one convexly curved blade track in the expanded blade position and the at least one blade extends radially outward beyond an outer surface of the tubular body in the expanded position, wherein the convexly curved surface of the at least one convexly curved blade track extends toward the outet surface of the tubular body, the lower longitudinal end located below an upper longitudinal end of the at least one convexly curved blade track when the expandable reamer apparatus is disposed vertically in a borehole.

15. The method of claim 14, wherein engaging the at least one blade with the at least one convexly curved blade track comprises inserting a lateral protrusion of the at least one blade within a complementary lateral recess of the at least one convexly curved blade track.

16. The method of claim 14, further comprising configuring the at least one blade and the at least one convexly curved blade track such that the at least one blade does not extend radially outward beyond the outer surface of the tubular body in the retracted blade position, and such that the at least one blade extends radially outward beyond the outer surface of the tubular body adjacent the at least one blade by a distance of at least 2.54 centimeters in the expanded blade position.

17. The method of claim 14, further comprising configuring the at least one blade and the at least one convexly curved blade track such that the expandable reamer apparatus has a retracted diameter defined as a maximum diameter of the expandable reamer apparatus when the at least one blade is in the retracted blade position, and an expanded diameter defined as a reaming diameter of the expandable reamer apparatus when the at least one blade is in the expanded blade position, wherein a ratio of the expanded diameter to the retracted diameter is at least 1.1 to 1.0.

18. The method of claim 17, wherein the ratio of the expanded diameter to the retracted diameter is at least 1.25 to 1.0.

* * * * *

UNITED STATES PATENT AND TRADEMARK OFFICE
CERTIFICATE OF CORRECTION

PATENT NO. : 9,745,800 B2  
APPLICATION NO. : 15/174059  
DATED : August 29, 2017  
INVENTOR(S) : Carl E. Poteet, III Page 1 of 1

It is certified that error appears in the above-identified patent and that said Letters Patent is hereby corrected as shown below:

On the Title Page

In ITEM (63) Related U.S. Application Data:   change "Mar. 5, 2013."  
to --Mar. 5, 2013, now Pat. No. 9,388,638.--

In the Claims

Claim 14,   Column 12,   Line 3:   change "the outet surface" to --the outer surface--

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*